United States Patent
Helmers et al.

(10) Patent No.: US 12,256,326 B2
(45) Date of Patent: Mar. 18, 2025

(54) PREVENTING SIGNALING BASED MINIMIZATION OF DRIVE TEST CONFIGURATION OVERWRITE IN DUAL CONNECTIVITY

(71) Applicant: Nokia Technologies Oy, Espoo (FI)

(72) Inventors: Hakon Helmers, Sceaux (FR); Malgorzata Tomala, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 357 days.

(21) Appl. No.: 17/755,960

(22) PCT Filed: Nov. 18, 2020

(86) PCT No.: PCT/IB2020/060830
§ 371 (c)(1),
(2) Date: May 12, 2022

(87) PCT Pub. No.: WO2021/099945
PCT Pub. Date: May 27, 2021

(65) Prior Publication Data
US 2022/0394609 A1    Dec. 8, 2022

Related U.S. Application Data

(60) Provisional application No. 62/936,903, filed on Nov. 18, 2019.

(51) Int. Cl.
*H04W 4/00*      (2018.01)
*H04W 24/10*     (2009.01)
(Continued)

(52) U.S. Cl.
CPC .......... *H04W 48/20* (2013.01); *H04W 24/10* (2013.01); *H04W 48/08* (2013.01)

(58) Field of Classification Search
CPC ...... H04W 48/20; H04W 24/10; H04W 48/08
See application file for complete search history.

(56) References Cited

U.S. PATENT DOCUMENTS

| 2014/0022910 A1* | 1/2014 | Zhang | H04W 24/08 |
| | | | 370/241.1 |
| 2021/0377753 A1* | 12/2021 | Li | H04W 24/02 |

(Continued)

FOREIGN PATENT DOCUMENTS

| WO | 2015/013192 A1 | 1/2015 |
| WO | 2019/173936 A1 | 9/2019 |

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)", 3GPP TS 37.320, V15.0.0, Jun. 2018, pp. 1-27.

(Continued)

*Primary Examiner* — Abdelnabi O Musa
(74) *Attorney, Agent, or Firm* — SQUIRE PATTON BOGGS (US) LLP (57) ABSTRACT

A method may include receiving, at a user equipment, a configuration message from a network element. The method may also include detecting a signaling radio bearer that has been used to transmit the configuration message. The method may further include storing the configuration message according to a trigger associated with the configuration message, wherein the configuration message may be either management-based or signaling-based. Further, the method may include performing measurement data collection pertaining to a cell according to the configuration message.

17 Claims, 4 Drawing Sheets

(51) Int. Cl.
*H04W 48/08* (2009.01)
*H04W 48/20* (2009.01)

(56) References Cited

U.S. PATENT DOCUMENTS

| | | | | |
|---|---|---|---|---|
| 2021/0409992 | A1* | 12/2021 | Arshad | H04W 76/27 |
| 2022/0095181 | A1* | 3/2022 | Parichehrehteroujeni | ............ H04W 36/0058 |
| 2022/0141679 | A1* | 5/2022 | Chang | H04W 4/021 370/329 |
| 2022/0167196 | A1* | 5/2022 | Arshad | H04W 24/10 |
| 2022/0182850 | A1* | 6/2022 | Ramachandra | H04W 16/28 |
| 2022/0232410 | A1* | 7/2022 | Fang | H04W 24/08 |
| 2022/0272587 | A1* | 8/2022 | Arshad | H04W 36/0058 |
| 2022/0322373 | A1* | 10/2022 | Hong | H04W 72/542 |
| 2022/0386160 | A1* | 12/2022 | Wang | H04W 24/10 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331, V15.7.0, Sep. 2019, pp. 1-962.

"3rd Generation Partnership Project; Technical Specification Group Services and System Aspects; Telecommunication management; Subscriber and equipment trace; Trace control and configuration management (Release 15)", 3GPP TS 32.422, V15.2.0, Jun. 2019, pp. 1-189.

"Revised SID : Study on RAN-centric data collection and utilization for LTE and NR", 3GPP TSG RAN Meeting #81, RP-182105, Agenda: 9.3.13, CMCC, Sep. 10-13, 2018, 6 pages.

"Revised WID on SON/MDT support for NR", 3GPP TSG RAN meeting #85, RP-191776, Agenda:9.4.22, CMCC, Sep. 16-20, 2019, 5 pages.

Invitation to Pay Additional Fees received for corresponding Patent Cooperation Treaty Application No. PCT/IB2020/060830, dated Mar. 1, 2021, 12 pages.

"Network aspects of MDT for NR", 3GPP TSG-RAN WG3 #103, R3-190568, Agenda: 25.2.1, CMCC, Feb. 25-Mar. 1, 2019, pp. 1-3.

International Search Report and Written Opinion received for corresponding Patent Cooperation Treaty Application No. PCT/IB2020/060830, dated May 26, 2021, 18 pages.

Office action received for corresponding European Patent Application No. 20816601.7, dated Jun. 6, 2024, 5 pages.

European Intent to Grant European Patent issued in corresponding European Patent Application No. 20 816 601.7-1215 on Oct. 31, 2024.

* cited by examiner

PREVENTING SIGNALING BASED MINIMIZATION OF DRIVE TEST CONFIGURATION OVERWRITE IN DUAL CONNECTIVITY

RELATED APPLICATION

This application claims priority to PCT Application No. PCT/IB2020/060830, filed on Nov. 18, 2020, which claims priority to U.S. Provisional Application No. 62/936,903, filed on Nov. 18, 2019, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for preventing signaling based minimization of drive test configuration overwrite in dual connectivity.

SUMMARY

Some example embodiments are directed to a method. The method may include receiving, at a user equipment, a configuration message from a network element. The method may also include detecting a signaling radio bearer that has been used to transmit the configuration message. The method may further include storing the configuration message according to a trigger associated with the configuration message, wherein the configuration message may be either management-based or signaling-based. In addition, the method may include performing measurement data collection pertaining to a cell according to the configuration message.

Other example embodiments are directed to an apparatus that may include at least one processor and at least one memory including computer program code. The at least one memory and the computer program code are configured, with the at least one processor to cause the apparatus at least to receive a configuration message from a network element. The apparatus may also be caused to detect a signaling radio bearer that has been used to transmit the configuration message. The apparatus may further be caused to store the configuration message according to a trigger associated with the configuration message, wherein the configuration message may be either management-based or signaling-based. In addition, the apparatus may be caused to perform measurement data collection pertaining to a cell according to the configuration message.

Other example embodiments are directed to an apparatus. The apparatus may include means for receiving a configuration message from a network element. The apparatus may also include means for detecting a signaling radio bearer that has been used to transmit the configuration message. The apparatus may further include means for storing the configuration message according to a trigger associated with the configuration message, wherein the configuration message may be either management-based or signaling-based. In addition, the apparatus may include means for performing measurement data collection pertaining to a cell according to the configuration message.

In accordance with other example embodiments, a non-transitory computer readable medium may be encoded with instructions that may, when executed in hardware, perform a method. The method may include receiving, at a user equipment, a configuration message from a network element. The method may also include detecting a signaling radio bearer that has been used to transmit the configuration message. The method may further include storing the configuration message according to a trigger associated with the configuration message, wherein the configuration message may be either management-based or signaling-based. In addition, the method may include performing measurement data collection pertaining to a cell according to the configuration message.

Other example embodiments may be directed to a computer program product that performs a method. The method may include receiving, at a user equipment, a configuration message from a network element. The method may also include detecting a signaling radio bearer that has been used to transmit the configuration message. The method may further include storing the configuration message according to a trigger associated with the configuration message, wherein the configuration message may be either management-based or signaling-based. In addition, the method may include performing measurement data collection pertaining to a cell according to the configuration message.

Other example embodiments may be directed to an apparatus that may include circuitry configured to receive a configuration message from a network element. The apparatus may also include circuitry configured to detect a signaling radio bearer that has been used to transmit the configuration message. The apparatus may further include circuitry configured to store the configuration message according to a trigger associated with the configuration message, wherein the configuration message may be either management-based or signaling-based. In addition, the apparatus may include circuitry configured to perform measurement data collection pertaining to a cell according to the configuration message.

Certain example embodiments may be directed to a method. The method may include determining, by a network element, a new radio specific minimization of drive test configuration parameter, or a trace for a signaling based minimization of drive test. The method may also include configuring a user equipment by sending a configuration message to the user equipment. The method may further include signaling a message to another network element to negotiate a priority and a processing procedure of a minimization of drive test configuration for the user equipment.

Other example embodiments may be directed to an apparatus. The apparatus may include at least one processor and at least one memory including computer program code. The at least one memory and computer program code may be configured to, with the at least one processor, cause the apparatus at least to determine a new radio specific minimization of drive test configuration parameter, or a trace for a signaling based minimization of drive test. The apparatus may also be caused to configure a user equipment by sending a configuration message to the user equipment. The apparatus may further be caused to signal a message to a network element to negotiate a priority and a processing procedure of a minimization of drive test configuration for the user equipment.

Other example embodiments may be directed to an apparatus. The apparatus may include means for determining a new radio specific minimization of drive test configuration parameter, or a trace for a signaling based minimization of drive test. The apparatus may also include means for configuring a user equipment by sending a configuration message to the user equipment. The apparatus may further include means for signaling a message to a network element to negotiate a priority and a processing procedure of a minimization of drive test configuration for the user equipment.

In accordance with other example embodiments, a non-transitory computer readable medium may be encoded with instructions that may, when executed in hardware, perform a method. The method may include determining, by a network element, a new radio specific minimization of drive test configuration parameter, or a trace for a signaling based minimization of drive test. The method may also include configuring a user equipment by sending a configuration message to the user equipment. The method may further include signaling a message to another network element to negotiate a priority and a processing procedure of a minimization of drive test configuration for the user equipment.

Other example embodiments may be directed to a computer program product that performs a method. The method may include determining, by a network element, a new radio specific minimization of drive test configuration parameter, or a trace for a signaling based minimization of drive test. The method may also include configuring a user equipment by sending a configuration message to the user equipment. The method may further include signaling a message to another network element to negotiate a priority and a processing procedure of a minimization of drive test configuration for the user equipment.

Other example embodiments may be directed to an apparatus that may include circuitry configured to determine a new radio specific minimization of drive test configuration parameter, or a trace for a signaling based minimization of drive test. The apparatus may also include circuitry configured to configure a user equipment by sending a configuration message to the user equipment. The apparatus may further include circuitry configured to signal a message to a network element to negotiate a priority and a processing procedure of a minimization of drive test configuration for the user equipment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for preventing signaling based minimization of drive test (MDT) configuration overwrite in dual connectivity (DC).

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

3rd Generation Partnership (3GPP) describes radio access network (RAN) centric data collection, which can provide mechanisms to assist operators in monitoring and optimizing their 5G deployment. These mechanisms may also provide a standardized method for data collection and utilization. Self-organizing network (SON) and MDT-oriented solutions (from LTE) may provide a baseline in the newly standardized method for data collection. Thus, automated data collection in 5G may inherit the two types of MDT including, for example, immediate MDT and logged MDT. These two MDT methods provide the ability to deliver real-time measurements (e.g., results of measurements performed from radio resource management (RRM) operators), and non real-time measurement results taken during the time a user equipment (UE) is out of network reach (e.g., in a radio resource control (RRC) IDLE state), respectively.

Furthermore, 3GPP specifies necessary standard enablers to support MDT in DC. However, according to legacy methods, only a master node (MN) may trigger logged MDT and immediate MDT configurations. Additionally, in a single node case (MN) the baseline principles of handling logged MDT configuration(s) may imply that newly arriving configuration(s) may overwrite any previous configuration(s).

Figure 1:
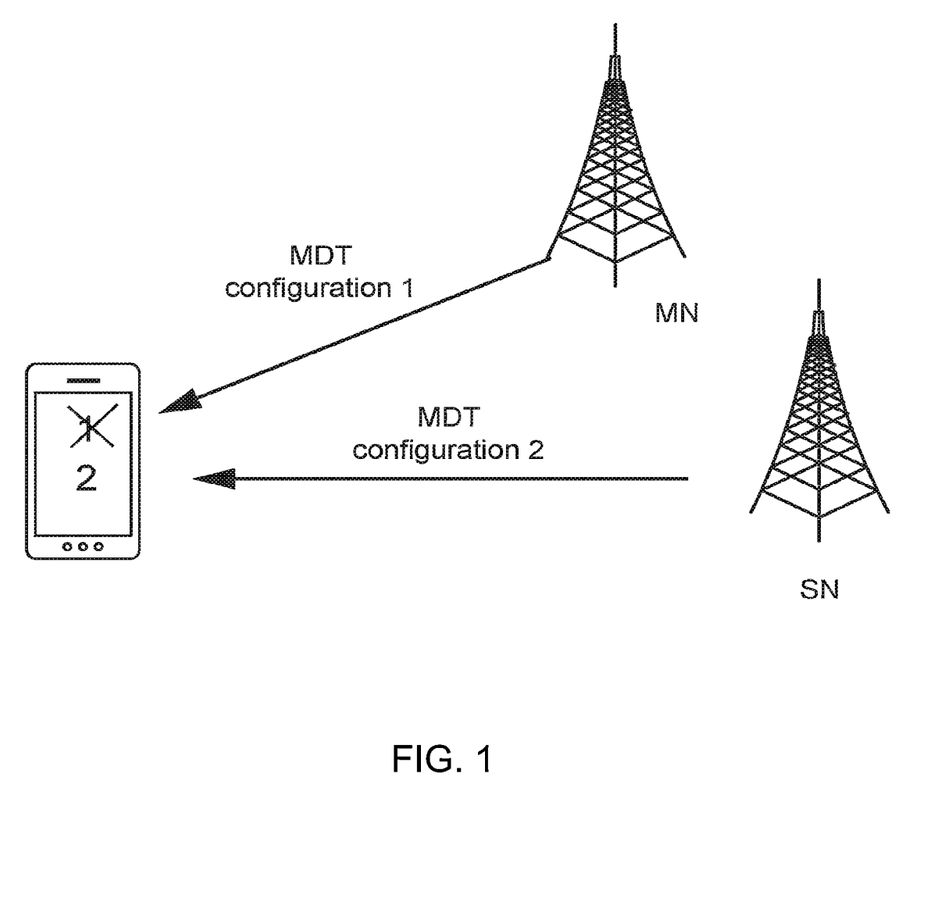
FIG. 1, an example minimization of drive test configuration in a dual connectivity scenario.

FIG. 1 illustrates an example MDT configuration in a DC scenario. In one example, DC may allow direct configurations by a secondary node (SN). However, there are currently no principles for handling the configuration and reporting in case two different nodes can schedule the same UE for the MDT. Further, if exactly the same method was applied for SN as it used to be for MN (FIG. 1), the other node may overwrite a previous message to the UE given by MN. In addition, the overwrite may be done without informing MN that its configuration has been overwritten. This replacement has not been considered as a problem in legacy MDT, as MDT configuration was only one radio access technology (RAT) specific. With Evolved Universal Terrestrial Radio Access (E-UTRA) New Radio DC (EN-DC) deployment, the configuration received from MN and SN may represent two different RATs, and the replacement may imply ignoring the operations, administration, and maintenance (OAM) trigger to collect data from another technology (e.g., 4G vs. 5G or vice versa). The eNB (controlling cells from one RAT, i.e. E-UTRA) and the en-gNB or the gNB (controlling cells of another RAT, i.e. NR) may use separate OAM systems. For example, OAMs may be from two different vendors or two OAMs configurations paths from the same vendor (NR OAM and EUTRA OAM). Further, MDT configurations may originate from these OAM systems, and it should not be excluded that the OAM system responsible for the NR cells could also generate EUTRA MDT configurations for the purpose of multi-RAT dual connectivity (MR-DC). For the same reason, the OAM system responsible for the EUTRA cells could generate MDT configurations for both EUTRA and NR. In addition, the two configurations may target different purposes and different RATs.

Furthermore, MDT configuration may originate from either management-based (targeting an area) or signaling-based tracing (targeting a user). In a case where a RAN node receives a management-based trigger, it does not matter which UE will be selected for data collection. However, signaling based MDT may be triggered towards one particular UE. If a UE has been selected for signaling-based tracing, it may suggest that the operator had a reason (e.g., customer complaints/care) to trace the device performance In one example, the UE may be MDT capable, and if its capability to collect data is selected by the other node (and RAT) to take part in management based MDT, the operator may lose the UE data. Further, lack of awareness that one node may involve the same UE in a different session than the other has not been resolved. Thus, realization of a method is currently non-existing in the standard, and therefore a solution is needed.

3GPP technical specifications (TS) generally describes immediate MDT configurations that are supported for DC scenarios. Further, logged MDT configurations may be received from the SN node in a DC scenario, and the existing MDT framework may be a baseline for the secondary cell group (SCG) cells related MDT configuration. In addition, the triggers for MDT measurements associated with master cell group (MCG) and SCG may be separate, and MN-SN coordination may be required for MDT measurements' configuration and reporting in the DC framework. Further, if signaling radio bearer (SRB) 3 is not configured, SN related measurements may be transmitted to the MN via SRB1/2, and then forwarded to the SN. However, if SRB3 is configured, then MN related measurements may be transmitted to the MN via SRB1/2, and SN related measurements may be transmitted to the SN via SRB3.

According to certain example embodiments, MDT configuration(s) may be handled in various scenarios including, for example, EN-DC scenarios where two RATs of two separate nodes are involved in triggering a UE to collect logged MDT data. Certain example embodiments also provide procedures to prioritize signaling based MDT over management based MDT, and ensure that the latter does not replace the configuration that has been specifically dedicated to the UE.

Certain example embodiments may also provide OAM and core network (CN) signaling procedures. For example, signaling between OAM and RAN for MDT trace activation may differentiate the configuration trigger for DC. In an example embodiment, the configuration may be split into LTE and NR specific MDT configurations.

Another example embodiment may provide procedures for inter-node signaling. Here, signaling between MN and SN may be defined to exchange information on the ongoing MDT configuration. Furthermore, the exchange may result in restricting the other node not to initiate any MDT configuration, or applying a limited configuration. For example, in one embodiment, restrictions may apply at least to avoid signaling based MDT overwriting. In another example embodiment, the exchange may result in feedback information towards the MN so that it instructs the SN how to generate MDT configuration(s). In another example embodiment, the exchange may result in storing the configuration and its propagation between the involved RAN nodes. In a further example embodiment, the exchange may result in feedback information towards the CN entity so that it receives information on impossibility to apply the sent MDT configuration(s).

Certain example embodiments may also provide certain UE procedures. For instance, according to one example embodiment, the UE may be capable of receiving logged MDT configuration(s) from the SN, managing in case of conflicting configuration(s) received, and notifying the network about the conflict.

According to certain example embodiments, trace configuration triggers may be extended with DC support for EN-DC. In an example embodiment, at the time of generating the MDT configuration, OAM may provide trace configuration (which may be mapped into another control message such as for example trace activation message) parameters applicable for MN only, SN only, or both. For example, in one embodiment, trace configuration parameters may include a flag on DC applicability. This attribute may be further compiled in a network node (e.g., an evolved NodeB (eNB) or gNB) to generate MDT signaling that allows LTE MDT specific configuration and NR MDT specific configuration. Alternatively, in another example embodiment, trace configuration parameters may directly include NR MDT specific configuration triggers (NR MDT configuration e.g. MDT configuration 2 in FIG. 1). In a further example embodiment, the parameters may be implemented as MDT specific configuration parameters in an initial context setup request message.

Based on the received MDT configuration, in an example embodiment, the receiving node (e.g., eNB or gNB), which may be involved in EN-DC, may determine NR specific MDT configuration parameters that may include periodicity or event-triggered configurations for NR radio measurement results. According to another example embodiment, the receiving node may determine trace activation for signaling based MDT type, which may be provided with the NR specific MDT configuration parameters or the flag on DC applicability. In an example embodiment, the parameters may be defined or applied on LTE, NR, or both. In another example embodiment, the trace activation for signaling based MDT type may be received over an S1 application protocol (AP).

According to certain example embodiments, the MN may compile the MDT configuration that includes a legacy part (EUTRAN MDT configuration, e.g. MDT configuration 1 in FIG. 1), and a newly supported enabler for EN-DC specific MDT configuration. In an example embodiment, the MN may generate signaling towards the SN to negotiate priorities and processing of MDT NR configurations. For instance, in an example embodiment, the MN may decide whether to send NR MDT configuration to the SN so that the SN may trigger (e.g., send or transmit) the configuration towards the UE.

According to an example embodiment, if the original configuration from the OAM was signaling-based MDT, then the MN may restrict the SN from selecting the same UE for configuration of management based MDT. For instance, in an example embodiment, the MN may decide whether to send NR MDT configuration to the SN so that the SN may trigger the configuration towards the UE. In another example embodiment, this may be accomplished by using an X2 interface message with a flag to not involve the UE in the management-based MDT. In a further example embodiment, this may be accomplished by using an X2 interface message with a flag to not allow the management-based MDT due to involvement in DC. Alternatively, in another example embodiment, if the procedure is extended to a MR-DC case, the SN may inform the MN about restriction(s) not to involve the same UE in management based MDT if it was already involved in signaling-based MDT. For instance, the SN may decide to inform the MN that the signaling based configuration towards the UE has been made, and management-based MDT should not be allowed in the MN area. In a further example embodiment, this may be accomplished by using an Xn interface message with a flag to not allow the management-based MDT due to involvement in DC. According to a further example embodiment, based on the information exchange of the MN with the SN, the SN may be triggered to send the NR MDT configuration to the UE. For example, the SN may process the NR MDT configuration to send a LoggedMeasurementConfiguration over SRB3 with RRC signaling.

In certain example embodiments, the UE procedures may follow the MN-SN information exchange, or manage the two incoming MDT configurations for EN-DC by itself (in case the network-based exchange is not supported). For instance, in one embodiment, the UE may maintain one MDT configuration at a time. This may include, for example, the UE replacing the previous MDT configuration. In another example embodiment, the UE may log the event of overwriting MDT configuration. For example, the MDT data may be reported back to the network, and based on an analysis of the data by the network, the network may know that there was an attempt to configure the same UE for different MDT configurations. In addition, based on certain post-processing, it may be possible to determine the overall situation. According to a further example embodiment, the UE may log time stamps. The logged record may be realized by either placing logged MDT configuration (e.g., logged EUTRA MDT configuration) in the measurement logs, or tagging in the log with an indication that there were other RATs attempting the logged MDT configuration. According to another example embodiment, upon receiving the LoggedMeasurementConfiguration, the UE may detect which SRB has been used to pass the configuration, and may store the event in case configuration replacement concerned configurations coming from MN (e.g., eNB) and SN (e.g., gNB). In another example embodiment, the UE may store contexts and one or more MDT configurations.

In 3GPP TS 36.331, the E-UTRAN may initiate the logged measurement configuration procedure to the UE in RRC_CONNECTED state by sending the LoggedMeasurementConfiguration message via SRB1. When the UE is configured with DC, NG-RAN may initiate the logged measurement configuration procedure to the UE via SRB3. In certain example embodiments, upon receiving the LoggedMeasurementConfiguration message, the UE may, if the configuration was initiated by E-UTRAN, store the configuration-RAT set to E-UTRAN in a VarLogMeasConfig. Otherwise, the UE may store the configuration-RAT set to NG-RAN in the VarLogMeasConfig. According to an example embodiment, upon receiving the report and VarLogMeasConfig, the network may recognize that replacement of the configuration took place, which may allow the network to react accordingly.

According to an example embodiment, the logging principles for the UE in LTE may be enhanced in a way that it may always measure all possible detected cells, including LTE and NR as serving cells, and marks in the log that there was a change in the serving cell (RAT). In an example embodiment, this implementation may ensure broadcast data collection covers all possible detectable radio measurements by the UE without ignoring any RAT-specific configuration.

In certain example embodiments, the measurement results may cover LTE measurement results and neighboring cells resulting from cell re-selection process, NR measurement results and all neighboring cells resulting from cell re-selection process, and any cell selection state indicating lack of detectable cell in LTE and NR. In all the above cases, the UE may indicate the serving cell and RAT (and the change in serving RAT). In another example embodiment, the UE may indicate in the log, a serving RAT change and, thus, a serving cell change.

According to certain example embodiments, the UE may keep both MDT configurations and two MDT contexts. For instance, in two separate variables for logged measurement results, the UE may store LTE and NR specific logs according to a RAT-specific configuration. In addition, the UE may tag different log information pertaining to different MDT configurations, i.e. RAT-specific or configuration trigger specific (e.g. management based or signaling based-tracing).

Additionally, certain example embodiments may provide radio access network trace collection entity (RAN-TCE) signaling. In RAN-TCE signaling, the MN node may retrieve MDT reports from the UE, and may forward the data to a TCE. However, in certain example embodiments, the signaling procedures and formats that result from the interaction defined for DC support that different RAT-specific records are sent in one reporting file.

Figure 2:
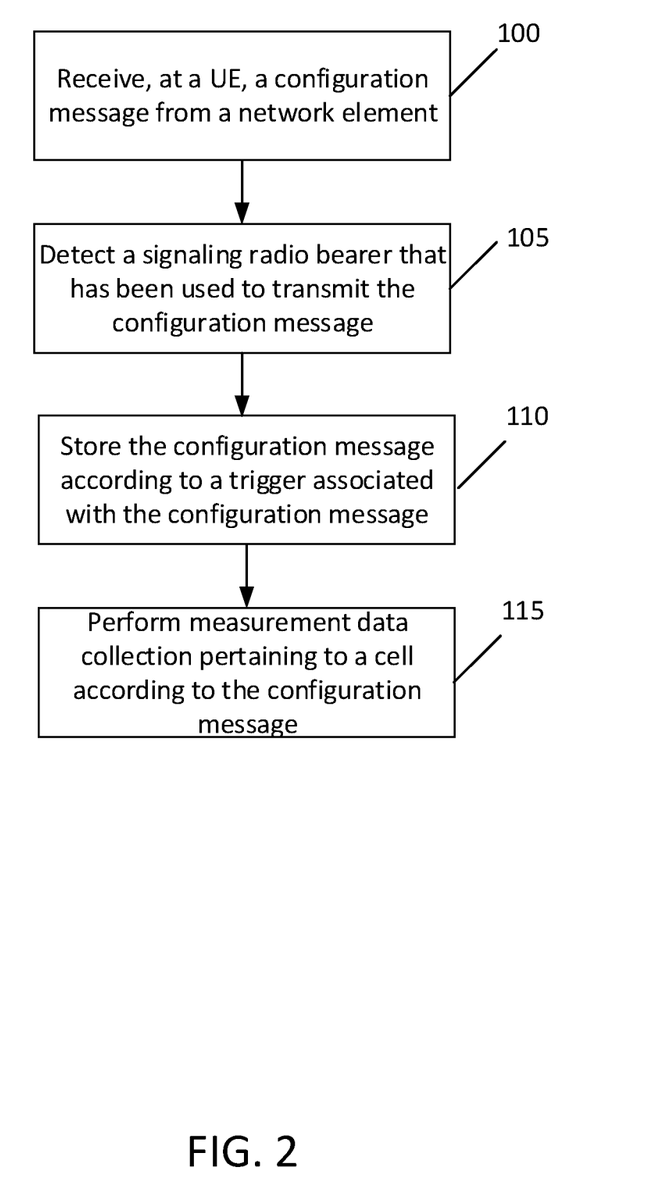
FIG. 2 illustrates a flow diagram of a method, according to certain example embodiments.

FIG. 2 illustrates a flow diagram of a method, according to certain example embodiments. In certain example embodiments, the flow diagram of FIG. 2 may be performed by a mobile station and/or UE, for instance similar to apparatus 10 illustrated in FIG. 4(a). According to one example embodiment, the method of FIG. 2 may include initially, at 100, receiving, at a UE, a configuration message from a network element. The method may also include, at 105, detecting a signaling radio bearer that has been used to transmit the configuration message. In addition, the method may include, at 110, storing the configuration message according to a trigger associated with the configuration message, wherein the configuration message may be either management-based or signaling-based. At 115, the method may include performing measurement data collection pertaining to a cell according to the configuration message.

In an example embodiment, storing the configuration message may occur according to a radio access technology associated with the configuration message. In another example embodiment, the method may further include identifying a serving cell and a serving radio access technology of the UE. According to another example embodiment, the method may include identifying a trigger pertaining to signaling-based tracing or management-based tracing. According to further example embodiments, the method may include managing the configuration message in case of a conflict with another configuration message, and notifying the network element about the conflict or the stored configuration message (e.g. positive or negative response or reject message). In an example embodiment, managing of the configuration message may imply storing the configuration message. Yet, in another example embodiment, managing of the configuration message may imply ignoring or rejecting the configuration message. In a further example embodiment, the configuration message may include minimization of drive tests configurations for evolved universal terrestrial radio access new radio dual connectivity. According to another example embodiment, the method may include storing LTE and NR specific logs. In a further example embodiment, the method may include tagging the LTE and NR specific logs.

Figure 3:
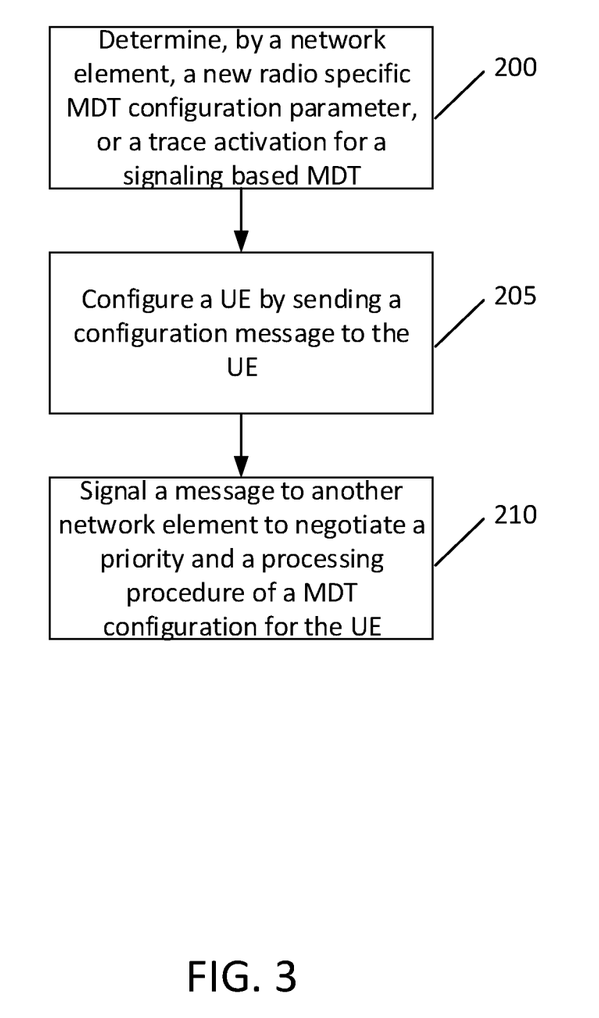
FIG. 3 illustrates a flow diagram of another method, according to certain example embodiments.

FIG. 3 illustrates a flow diagram of another method, according to certain example embodiments. In an example embodiment, the method of FIG. 3 may be performed by a telecommunications network, network entity or network node in a 3GPP system, such as LTE or 5G-NR. For instance, in an example embodiment, the method of FIG. 3 may be performed by a base station, eNB, or gNB for instance similar to apparatus 20 illustrated in FIG. 4(b).

According to an example embodiment, the method of FIG. 3 may include initially, at 200, determining, by a network element, a new radio specific minimization of drive test configuration parameter, or a trace activation for a signaling based minimization of drive test.

The method may also include, at 205, configuring a UE by sending a configuration message to the UE. Further, at 210, the method may include signaling a message to another network element to negotiate a priority and a processing procedure of a MDT configuration for the user equipment. In an example embodiment, negotiating the priority and the processing procedure may include restricting the another network element from selecting the user equipment for MDT configuration.

According to an example embodiment, the message may include a flag indicating to the another network not to select the user equipment. According to an example embodiment, the message may include a flag indicating to the another network element not to allow management based MDT configuration due to involvement in signaling based MDT configuration. According to further example embodiments, the message may include a flag indicating to the network element to inform about ongoing involvement in signaling based minimization of drive test configuration to not to allow management based minimization of drive test configuration. In a further example embodiment, the message may include a flag indicating to the another network element not to propagate management based MDT configuration due to involvement in signaling based MDT configuration. According to another example embodiment, the configuration message may include minimization of drive tests configurations for evolved universal terrestrial radio access new radio dual connectivity.

Figure 4A:
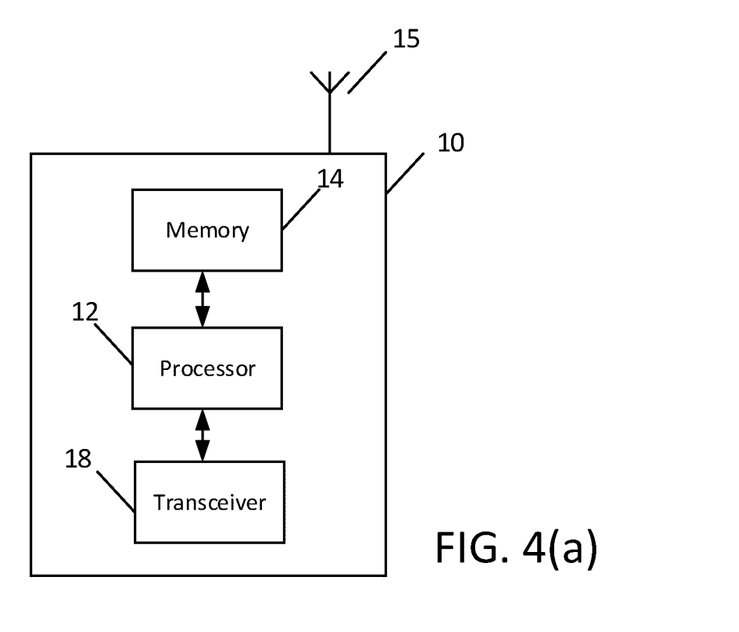
FIG. 4(a) illustrates an apparatus, according to certain example embodiments.

FIG. 4(a) illustrates an apparatus 10 according to certain example embodiments. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 4(a).

As illustrated in the example of FIG. 4(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 4(a), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1 and 2.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1 and 2.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE for example. According to certain embodiments, apparatus 10 may be controlled by memory 14 and processor 12 to perform the functions associated with example embodiments described herein. For instance, in one embodiment, apparatus 10 may be controlled by memory 14 and processor 12 to receive a configuration message from a network element. Apparatus 10 may also be controlled by memory 14 and processor 12 to detect a signaling radio bearer that has been used to transmit the configuration message. Apparatus 10 may further be controlled by memory 14 and processor 12 to store the configuration message according to a trigger associated with the configuration message, wherein the configuration message may be either management-based or signaling-based. In addition, apparatus 10 may be controlled by memory 14 and processor 12 to perform measurement data collection pertaining to a cell according to the configuration message.

Figure 4B:
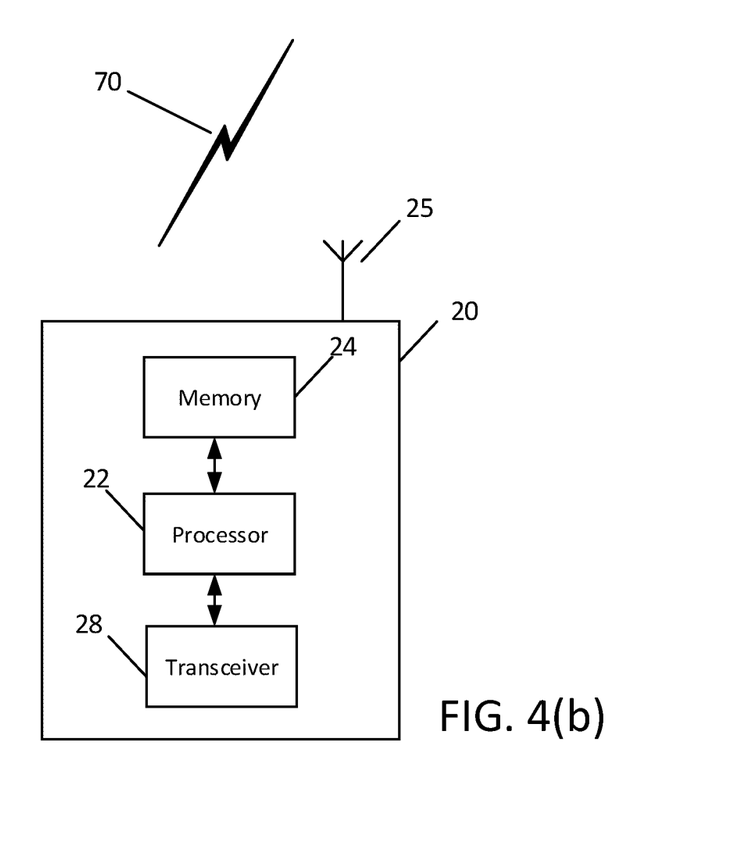
FIG. 4(b) illustrates another apparatus, according to certain example embodiments.

FIG. 4(*b*) illustrates an apparatus 20 according to certain example embodiments. In an example embodiment, the apparatus 20 may be a RAT, node, host, or server in a communication network or serving such a network. For example, apparatus 20 may be a base station, a Node B, an evolved Node B (eNB), 5G Node B or access point, next generation Node B (NG-NB, en-gNB or gNB), and/or WLAN access point, associated with a radio access network (RAN), such as an LTE network, 5G or NR. It should be noted that one of ordinary skill in the art would understand that apparatus 20 may include components or features not shown in FIG. 4(*b*).

As illustrated in the example of FIG. 4(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4(*b*), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1 and 3.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1 and 3.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a radio resource manager, RAT, node, host, or server in a communication network or serving such a network. For example, apparatus 20 may be a satellite, base station, a Node B, an evolved Node B (eNB), 5G Node B or access point, next generation Node B (NG-NB, en-gNB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in one embodiment, apparatus 20 may be controlled by memory 24 and processor 22 to determine a new radio specific minimization of drive test configuration parameter, or a trace activation for a signaling based minimization of drive test. Apparatus 20 may also be controlled by memory 24 and processor 22 to configure a UE by sending the configuration message to the UE. In addition, apparatus 20 may be controlled by memory 24 and processor 22 to signal a message to a network element to negotiate a priority and a processing procedure of a MDT configuration for the user equipment.

Further example embodiments may provide means for performing any of the functions or procedures described herein. For example, certain example embodiments may be directed to an apparatus that includes means for receiving a configuration message from a network element. The apparatus may also include means for detecting a signaling radio bearer that has been used to transmit the configuration message. The apparatus may further include means for storing the configuration message according to a trigger associated with the configuration message, wherein the configuration message may be either management-based or signaling-based. In addition, the apparatus may include means for performing measurement data collection pertaining to a cell according to the configuration message.

Other example embodiments may be directed to a further apparatus that includes means for determining a new radio specific minimization of drive test configuration parameter, or a trace for a signaling based minimization of drive test. The apparatus may also include means for configuring a user equipment by sending a configuration message to the user equipment. The apparatus may further include means for signaling a message to a network element to negotiate a priority and a processing procedure of a minimization of drive test configuration for the user equipment.

Certain example embodiments described herein provide several technical improvements, enhancements, and/or advantages. In some example embodiments, it may be possible to provide network coordination to avoid negative impact on the UE. It may also be possible to provide a mechanism for managing a UE's contexts, and coordinating between different MDT configurations from different network nodes. Additionally, it may be possible to provide a mechanism to prevent MDT configuration overwrite in a UE under an EN-DC deployment. Additionally, it may be possible to provide a mechanism to enable customer care process, and coordination on tracing critical issues in the network in inter-RAT deployments. Furthermore, it may be possible to provide a mechanism to control simultaneous configurations coming from different origins (e.g., RATs, vendors).

According to another example embodiment, it may be possible to enhance logging principles for the UE in LTE. It may also be possible to ensure that broadcast data collection covers all possible detectable radio measurements by the UE without ignoring any RAT-specific configuration.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

A first embodiment is directed to a method that may include receiving, at a user equipment, a configuration message from a network element. The method may also include detecting a signaling radio bearer that has been used to transmit the configuration message. The method may further include storing the configuration message according to a radio access technology associated with the configuration message. In addition, the method may include performing measurement data collection pertaining to a cell according to the configuration message.

In a variant, the method may further include identifying a serving cell and a serving radio access technology of the user equipment.

In a variant, the method may further include managing the configuration message in case of a conflict with another configuration message, and notifying the network element about the conflict.

In a variant, the configuration message may include minimization of drive tests configurations for evolved universal terrestrial radio access new radio dual connectivity.

In a variant, the method may further include storing long-term evolution and new radio specific logs.

In a variant, the method may further include tagging the long-term evolution and new radio specific logs.

A second embodiment may be directed to a method that may include determining, by a network element, a new radio specific minimization of drive test configuration parameter, or a trace for a signaling based minimization of drive test. The method may also include configuring a user equipment by sending a configuration message to the user equipment. The method may further include signaling a message to another network element to negotiate a priority and a processing procedure of the MDT configuration for the user equipment.

In a variant, negotiating the priority and the processing procedure may include restricting the another network element from selecting the user equipment for MDT configuration.

In a variant, the message may include a flag indicating to the another network not to select the user equipment.

In a variant, the message may include a flag indicating to the another network not to allow management based MDT configuration due to involvement in signaling based MDT configuration.

In a variant, the message may include a flag indicating to the another network not to propagate management based MDT configuration due to involvement in signaling based MDT configuration.

In a variant, the configuration message comprises minimization of drive tests configurations for evolved universal terrestrial radio access new radio dual connectivity.

Another embodiment is directed to an apparatus including at least one processor and at least one memory including computer program code. The at least one memory and the computer program code may be configured, with the at least one processor, to cause the apparatus at least to perform the method according to the first embodiment or the second embodiment or any of their variants discussed above.

Another embodiment is directed to an apparatus that may include circuitry configured to perform the method according to the first embodiment or the second embodiment or any of their variants.

Another embodiment is directed to an apparatus that may include means for performing the method according to the first embodiment or the second embodiment or any of their variants.

Another embodiment is directed to a computer readable medium including program instructions stored thereon for performing at least the method according to the first embodiment or the second embodiment or any of their variants.

| Partial Glossary | |
|---|---|
| CN | Core Network |
| eNB | Enhanced Node B |
| gNB | 5G or NR Base Station |
| LTE | Long Term Evolution |
| MCG | Master Cell Group |
| MDT | Minimization of Drive Test |
| MN | Master Node |
| NR | New Radio |
| OAM | Operations, Administration, and Maintenance |
| RAN | Radio Access Network |
| RRC | Radio Resource Control |
| RRM | Radio Resource Management |
| SCG | Secondary Cell Group |
| SN | Secondary Node |
| SON | Self-Organizing Network |
| UE | User Equipment |

We claim:

1. A method, comprising:
receiving, at a user equipment, a configuration message from a network element;
identifying a trigger pertaining to signaling-based tracing or management-based tracing, wherein the configuration message is for either management-based or signaling-based logged measurement, and wherein the trigger is associated with the configuration message;
storing the configuration message according to the trigger; and
performing measurement data collection pertaining to a cell according to the configuration message.

2. The method according to claim 1, wherein storing the configuration message occurs according to a radio access technology associated with the configuration message.

3. The method according to claim 1, further comprising identifying a serving cell and a serving radio access technology of the user equipment.

4. The method according to claim 1, further comprising:
managing the configuration message in case of a conflict with another configuration message; and
notifying the network element about the conflict or the stored configuration message.

5. The method according to claim 1, wherein the configuration message comprises minimization of drive test configurations for evolved universal terrestrial radio access new radio dual connectivity.

6. The method according to claim 1, further comprising storing long-term evolution and new radio specific logs.

7. The method according to claim 6, further comprising tagging the long-term evolution and new radio specific logs.

8. A method, comprising:
sending a configuration message to a user equipment, wherein a trigger pertains to signaling-based tracing or management-based tracing, wherein the configuration message is for either management-based or signaling-based logged measurement, and wherein the trigger is associated with the configuration message; and
receiving long-term evolution and new radio specific measurement logs.

9. The method according to claim 8, wherein the measurement logs are tagged as the long-term evolution and new radio specific measurement logs.

10. An apparatus, comprising:
at least one processor; and
at least one memory comprising computer program code, the at least one memory and the computer program code are configured, with the at least one processor to cause the apparatus at least to:
receive a configuration message from a network element;
identify a trigger pertaining to signaling-based tracing or management-based tracing, wherein the configuration message is for either management-based or signaling-based logged measurement, and wherein the trigger is associated with the configuration message;
store the configuration message according to the trigger; and
perform measurement data collection pertaining to a cell according to the configuration message.

11. The apparatus according to claim 10, wherein storing the configuration message occurs according to a radio access technology associated with the configuration message.

12. The apparats according to claim 10, wherein the at least one memory and the computer program code are configured, with the at least one processor to cause the apparatus to identify a serving cell and a serving radio access technology of the apparatus.

13. The apparats according to claim 10, wherein the at least one memory and the computer program code are configured, with the at least one processor to cause the apparatus to:
manage the configuration message in case of a conflict with another configuration message; and
notify the network element about the conflict or the stored configuration message.

14. The apparats according to claim 10, wherein the configuration message comprises minimization of drive test configurations for evolved universal terrestrial radio access new radio dual connectivity.

15. The apparats according to claim 10, wherein the at least one memory and the computer program code are configured, with the at least one processor to cause the apparatus to store long-term evolution and new radio specific logs.

16. The apparats according to claim 15, wherein the at least one memory and the computer program code are configured, with the at least one processor to cause the apparatus to tag the long-term evolution and new radio specific logs.

17. A non-transitory computer readable medium comprising program instructions stored thereon, which, when executed by at least one processor, causes the at least one processor to:
receive a configuration message from a network element;
identify a trigger pertaining to signaling-based tracing or management-based tracing, wherein the configuration message is for either management-based or signaling-based logged measurement, and wherein the trigger is associated with the configuration message;
store the configuration message according to the trigger; and
perform measurement data collection pertaining to a cell according to the configuration message.

* * * * *